J. C. DE BRUYN.
BELT GEARING FOR DRILL PRESSES.
APPLICATION FILED FEB. 2, 1911.

1,008,311.

Patented Nov. 14, 1911.

2 SHEETS—SHEET 2.

Witnesses
Harold O. Van Antwerp
Anna De Windt

Inventor
John C. De Bruyn.
By Luther V. Moulton
Attorney

UNITED STATES PATENT OFFICE.

JOHN C. DE BRUYN, OF GRAND RAPIDS, MICHIGAN, ASSIGNOR TO GUARANTEE MACHINE CO., OF GRAND RAPIDS, MICHIGAN, A CORPORATION OF MICHIGAN.

BELT-GEARING FOR DRILL-PRESSES.

1,008,311.   Specification of Letters Patent.   Patented Nov. 14, 1911.

Application filed February 2, 1911. Serial No. 606,198.

*To all whom it may concern:*

Be it known that I, JOHN C. DE BRUYN, a citizen of the United States of America, residing at Grand Rapids, in the county of Kent and State of Michigan, have invented certain new and useful Improvements in Belt-Gearing for Drill-Presses; and I do hereby declare the following to be a full, clear, and exact description of the invention, such as will enable others skilled in the art to which it appertains to make and use the same.

Figure 1:
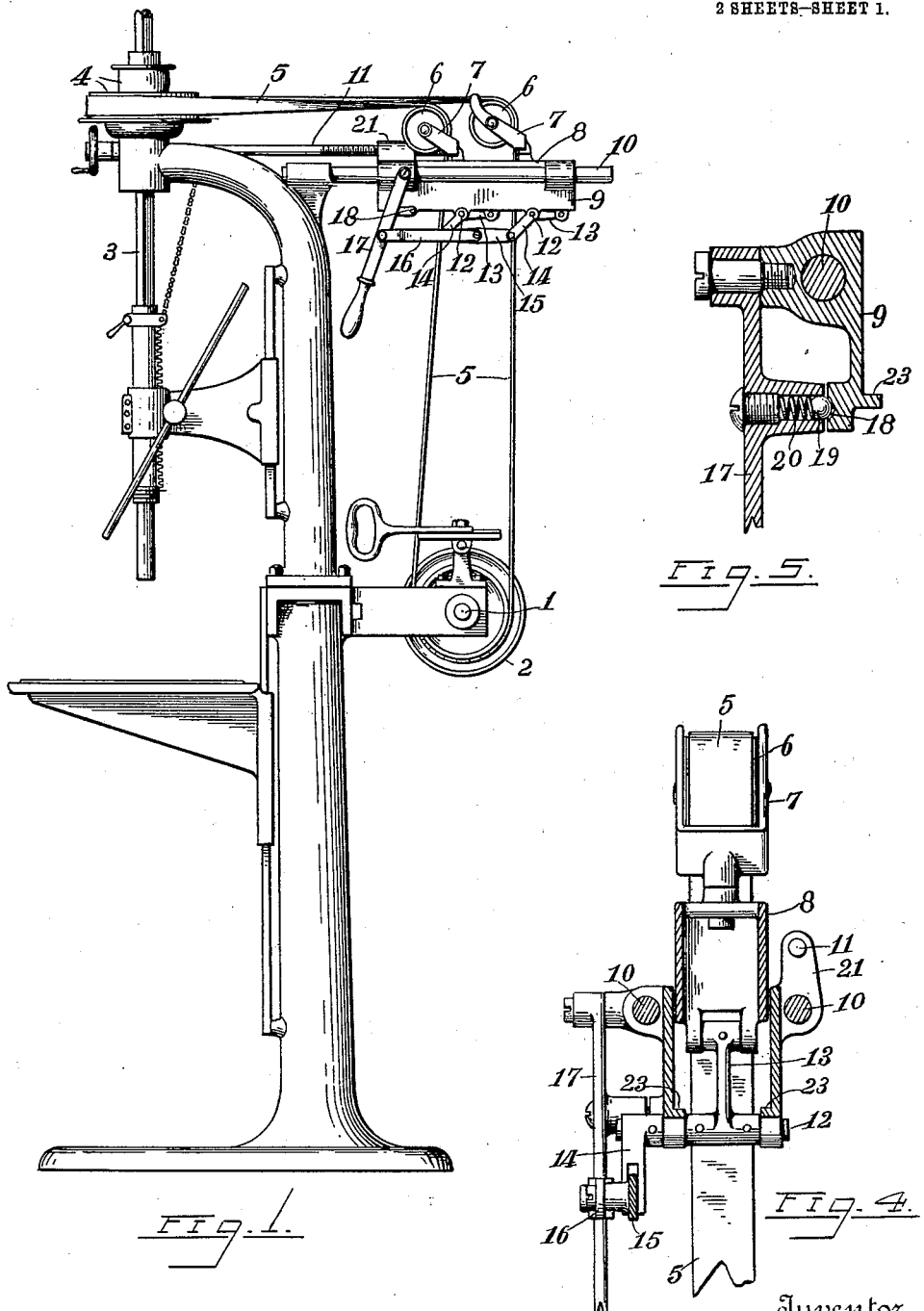
Figure 2:
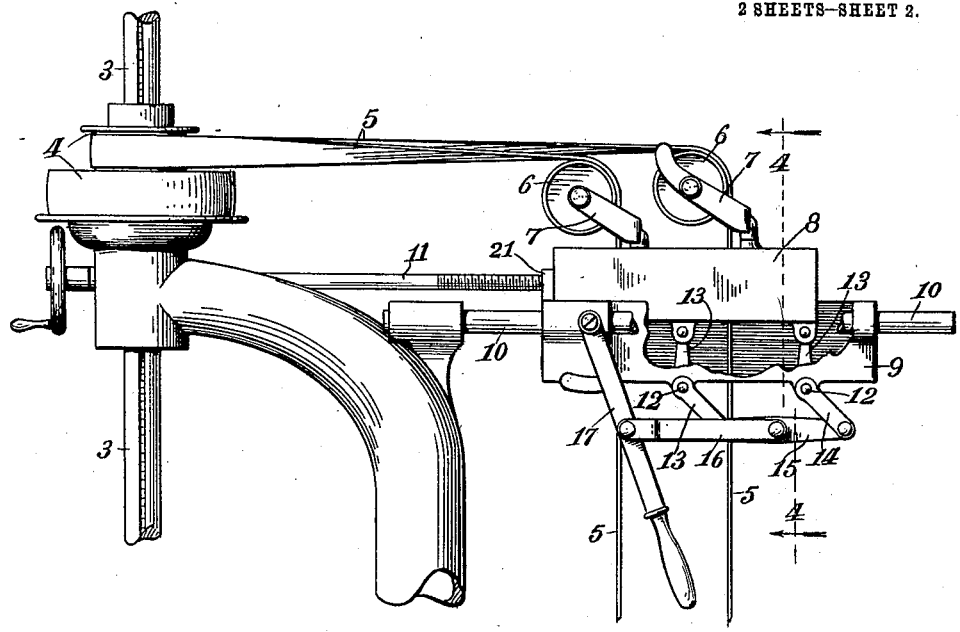
Figure 3:
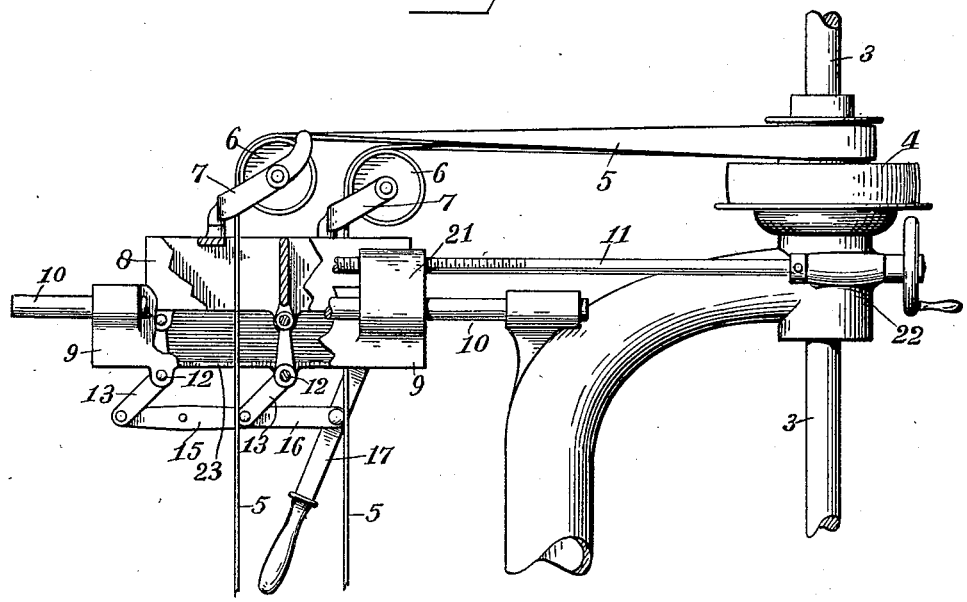

My invention relates to improvement in belt gearing for drill presses and its object is to provide the same with improved means for driving the spindle at various speeds; improved means for tightening the belt; improved means for adjusting the idlers, and to provide the device with various new and useful features hereinafter more fully described and particularly pointed out in the claims, reference being had to the accompanying drawings in which;

Figure 1 is a side elevation of a device embodying my invention with the idlers lowered and the belt on the large spindle pulley; Fig. 2 is an enlarged detail of the upper part of the same with the idlers elevated and the belt on the small spindle pulley and parts broken away; Fig. 3 the same shown from the opposite side to Fig. 2 and with parts broken away; Fig. 4 transverse section on the line 4—4 of Fig. 2 and; Fig. 5 a detail in vertical section of a portion of the shifting lever and parts adjacent thereto.

Like numbers refer to like parts in all of the figures.

1 represents a counter-shaft at the rear of the machine, 2 pulleys of different sizes on the counter-shaft and longitudinally shiftable thereon to bring them in line with the idlers.

3 represents the drill spindle, 4 pulleys of different sizes splined on the drill spindle to drive the same.

5 is an endless belt to drive the drill spindle which engages either one of the pulleys 2 on the counter-shaft and either one of the pulleys 4 on the spindle and extends upward from the counter-shaft over idler pulleys 6 and thence horizontally to the spindle pulley. Each idler 6 is mounted in a yoke 7 pivoted on a horizontal axis and carried in an adjustable support 8 mounted in a carriage movable on a pair of rods 10 projecting horizontally from the frame of the machine. This carriage is adjusted on these rods by a screw 11 engaging an arm 21 on one side of the carriage and extending thence horizontally to the front of the machine and journaled in a suitable bearing 22 on the frame. The support 8 is mounted on arms 13 and carried thereby within the carriage upward and forward each arm moving in the arc of a circle about the axis of a rock shaft 12, journaled in the lower side of the carriage. These rock shafts have the respective arms 13 fixed thereon and are simultaneously rotated by means of levers 14 fixed thereon and coupled together by a connecting rod 15 to which rod is pivoted one end of a parallel rod 16, the other end of the same being pivoted to a manually operated lever 17 whereby the rock shafts are simultaneously rotated, to raise and lower the support 8. When in elevated position the arms 13 project directly upward from the rock shafts 12 and the support 8 is held in contact with the end of the carriage by the belts, and also further held by a ball 19, inserted in a boss in the lever 17 which ball is engaged with a recess 18 in the carriage by a spring 20 and yieldingly holds the lever in position. When the support is lowered by shifting the lever and turning the arms 13 to a horizontal position the support then rests on inwardly projecting ribs 23 in the lower part of the carriage 9. When in elevated position the pulleys 6 are in proper position to guide the belt relative to the upper or smaller pulley 4 on the spindle, and when in lowered position they are moved downward and rearward and are then in proper position to guide the belt relative to the lower or larger pulley on the spindle.

The carriage 9 and support 8 have side and end walls and are open at the top and bottom to permit the belt to pass downward therethrough and by properly adjusting the carriage on the rods 10 by means of the screw 11 the belt can be properly tightened when adjusted upon any two of the pulleys respectively on the counter-shaft 1 and the spindle 3 the device is thus adjustable for any one of four different speeds of the spindle and the swiveled yokes 7 adjust automatically to adapt their position to the direction of the belt engaging either the small or the large pulley on the spindle. By mounting the carriage on rods at its respective sides extending through lugs on the carriage as shown, I am able to provide a very simple and effective device, and by the construction shown for adjusting the idler pulleys the device is quickly and easily adjusted for any of the four speeds of the spindle.

What I claim is:—

1. A belt gearing, comprising a vertical spindle, a horizontal shaft, pulleys on the spindle and shaft, a belt engaging said pulleys, a horizontally adjustable carriage, two rock shafts on the carriage, arms on the respective rock shafts, a support carried by the arms, idler pulleys mounted on the support and engaging the belts, and means for adjusting the rock shafts to adjust the support.

2. A belt gearing, comprising a spindle and a counter shaft, pulleys of different sizes on the spindle one above the other, a pulley on the counter shaft, parallel rods spaced apart, a carriage open at top and bottom and adjustable on the rods, two rock shafts in the lower part of the carriage, arms on the respective rock shafts, a support adjustably carried by the arms, levers fixed on the shafts, a coupling rod connecting the levers, a manually operated lever to adjust the rock shafts, idler pulleys mounted on the support and a belt connecting the pulleys on the counter shaft and spindle, said belt extending through the carriage and engaged by the idler pulleys.

3. Belt gearing for a drill press, comprising a vertical spindle, a horizontal counter shaft, pulleys of different sizes on the spindle, pulleys of different sizes adjustable on the shaft, a belt adjustable to connect any pulley on the shaft with any pulley on the spindle, a horizontally adjustable carriage open at the top and bottom, means for adjusting the carriage, a support adjustable within the carriage and also open at the top and bottom, said belt being extended through the carriage and support, idler pulleys mounted on the support and engaging the belt, two rock shafts in the lower part of the carriage, an arm on each rock shaft and connected to the support to carry and adjust the same, a lever on each rock shaft, a rod connecting the levers, a manually operated lever pivoted on the carriage, and a rod connecting the manually operated lever to the connecting rod.

4. Belt gearing for a drill press comprising a vertical spindle, a horizontal counter shaft, pulleys of different sizes on the spindle, a pulley on the counter shaft, rods extending at right angles to the spindle and spaced apart, a carriage carried between the rods and adjustable thereon, a screw to adjust the carriage, a support movable within the carriage, the support and carriage being open at the top and bottom, a belt engaging the pulleys and extending through the carriage and support, yokes swiveled in the support and carried thereby, idler pulleys journaled in the yokes and engaging the belt, two rock shafts in the lower part of the carriage, arms fixed on the shafts and carrying the support, a lever on each rock shaft, a rod connecting the levers and a manually operated lever to shift the rock shafts.

5. In a belt gearing for a drill press, a carriage slidably mounted on parallel rods, said carriage having sides and ends, and open at the top and bottom and also having inwardly projecting flanges on the lower edges of the sides, a support adjustable vertically and horizontally in the carriage, said support engaging the end of the carriage when elevated and resting on the flanges when lowered and means for adjusting the support, consisting of rock shafts and arms fixed thereon, said arms carrying and adjusting the support.

In testimony whereof I affix my signature in presence of two witnesses.

JOHN C. DE BRUYN.

Witnesses:
  PALMER A. JONES,
  LUTHER V. MOULTON.

Copies of this patent may be obtained for five cents each, by addressing the "Commissioner of Patents, Washington, D. C."